United States Patent
Litscher et al.

(10) Patent No.: US 9,216,744 B2
(45) Date of Patent: Dec. 22, 2015

(54) POWER TRAIN CONTROLLER AND ASSOCIATED MEMORY DEVICE

(75) Inventors: Christian M. Litscher, Lebanon, IN (US); Jeanne O. Rues, Indianapolis, IN (US); Michael J. Howenstein, Zionsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 1058 days.

(21) Appl. No.: 13/144,243

(22) PCT Filed: Jan. 7, 2010

(86) PCT No.: PCT/US2010/020361
§ 371 (c)(1),
(2), (4) Date: Feb. 14, 2012

(87) PCT Pub. No.: WO2010/083090
PCT Pub. Date: Jul. 22, 2010

(65) Prior Publication Data
US 2012/0143447 A1 Jun. 7, 2012

Related U.S. Application Data

(60) Provisional application No. 61/144,179, filed on Jan. 13, 2009.

(51) Int. Cl.
*G06F 7/00* (2006.01)
*B60W 50/02* (2012.01)
(Continued)

(52) U.S. Cl.
CPC ........... *B60W 50/02* (2013.01); *B60W 50/0098* (2013.01); *B60K 6/00* (2013.01);
(Continued)

(58) Field of Classification Search
CPC ... F16H 61/0213; F16H 61/061; F16H 59/44; B60W 10/06; B60W 10/11; B60W 50/02; B60W 50/0098; B60W 10/10; G05D 1/00; G06F 7/00; G06F 19/00; B60C 11/24; B60C 23/048; G01M 17/04; G01M 17/007; B60K 6/48; B60K 6/547; G01L 5/28; G06G 7/48; B60T 17/221
USPC ........... 701/51, 53, 31.4, 54, 22, 2, 37; 703/8; 73/129; 180/65.25; 903/919; 318/139; 290/40 R, 1 R; 307/87; 415/17
See application file for complete search history.

(56) References Cited

U.S. PATENT DOCUMENTS 5,798,647 A 8/1998 Martin et al.
6,181,992 B1 1/2001 Gurne et al.
(Continued)

FOREIGN PATENT DOCUMENTS

CN 1108366 A 9/1995
DE 10234063 B4 2/2004
DE 102007015355 A1 3/2007

OTHER PUBLICATIONS

PCT International Search Report and Written Opinion for PCT/US2010/020361, completed Feb. 17, 2010.
(Continued)

*Primary Examiner* — Behrang Badii
(74) *Attorney, Agent, or Firm* — Barnes & Thornburg LLP (57) ABSTRACT

A power train subsystem for a motorized vehicle and methods of programming such power train controllers of the power train subsystem are disclosed. The power train subsystem may include a power train component, a controller, and a memory device. The controller may be coupled to the power train component to control operation of the power train component. The memory device may include boot code, application software, standard calibration parameters, and custom calibration parameters. The boot code provides an environment upon which the application software executes per the standard calibration parameters and custom calibration parameters. The standard calibration provides parameters which configure the controller for a range of vehicular applications. The custom calibration parameters provide parameters which configure the controller for a particular vehicular application in the range of vehicular applications.

10 Claims, 10 Drawing Sheets

(51) Int. Cl.
*B60W 50/00* (2006.01)
*G06F 19/00* (2011.01)
*B60K 6/00* (2007.10)
*G01M 17/04* (2006.01)
*B60T 17/22* (2006.01)
*G01M 17/007* (2006.01)
*G06G 7/48* (2006.01)
*G01L 5/28* (2006.01)
*B60K 6/547* (2007.10)
*B60K 6/48* (2007.10)
*B60W 10/06* (2006.01)
*B60W 10/10* (2012.01)

(52) U.S. Cl.
CPC ........ *B60K 6/48* (2013.01); *B60K 6/547* (2013.01); *B60T 17/221* (2013.01); *B60W 10/06* (2013.01); *B60W 10/10* (2013.01); *G01L 5/28* (2013.01); *G01M 17/007* (2013.01); *G01M 17/04* (2013.01); *G06F 19/00* (2013.01); *G06G 7/48* (2013.01)

(56) References Cited

U.S. PATENT DOCUMENTS

| | | | |
|---|---|---|---|
| 6,529,805 B2 | 3/2003 | Aldrich | |
| 6,612,386 B2* | 9/2003 | Tamai et al. | 180/65.25 |
| 6,865,459 B2 | 3/2005 | Harms | |
| 7,103,460 B1* | 9/2006 | Breed | 701/32.9 |
| 7,421,321 B2* | 9/2008 | Breed et al. | 701/33.6 |
| 7,694,555 B2* | 4/2010 | Howell et al. | 73/129 |
| 2002/0179347 A1* | 12/2002 | Tamai et al. | 180/65.2 |
| 2005/0192727 A1* | 9/2005 | Shostak et al. | 701/37 |
| 2005/0273218 A1* | 12/2005 | Breed et al. | 701/2 |
| 2006/0106510 A1 | 5/2006 | Heffington | |
| 2006/0259287 A1* | 11/2006 | Jacquelin et al. | 703/8 |
| 2007/0073908 A1 | 3/2007 | Gormley | |
| 2007/0250254 A1 | 10/2007 | Kimoto | |
| 2007/0260372 A1* | 11/2007 | Langer | 701/29 |
| 2007/0260373 A1* | 11/2007 | Langer et al. | 701/29 |
| 2007/0260438 A1* | 11/2007 | Langer et al. | 703/8 |
| 2008/0082245 A1 | 4/2008 | Fayyad et al. | |
| 2008/0236269 A1* | 10/2008 | Howell et al. | 73/121 |
| 2010/0305794 A1* | 12/2010 | Foster | 701/22 |

OTHER PUBLICATIONS

European Search Report and Written Opinion for Application No. 10731960.0, completed Oct. 15, 2013, 8 pages.

Search Report and Written Opinion from State Intellectual Property Office of the People's Republic of China for App. No. 201080009644.7, completed Aug. 9, 2013, 11 pages.

Written Opinion from the Examining Division for European Patent Application No. 10731960.0 dated Jul. 4, 2014, 4 pages.

* cited by examiner

POWER TRAIN CONTROLLER AND ASSOCIATED MEMORY DEVICE

CROSS-REFERENCE TO RELATED APPLICATIONS

This application is a U.S. national application under 35 U.S.C. §371(b) of International Application Serial No. PCT/US2010/020361 filed Jan. 7, 2010, which claims priority to U.S. Provisional Application No. 61/144,179 filed on Jan. 13, 2009. The disclosures of both of which are hereby expressly incorporated by reference in their entirety.

BACKGROUND

Vehicle subsystems such as, for example, transmissions, engines, and braking systems use individual control modules to control each of the subsystems and provide communication between such subsystems. Control modules are delivered to customers (e.g. vehicle manufacturers, service technicians, etc.) as single, self-contained, fully programmed units most often separate from the hardware to be controlled. Additionally, the control modules are often remotely located from the hardware to be controlled. These self-contained control modules permit the assembly of the vehicle to proceed independent of the final unique module configuration.

However, the industry appears to be moving toward integrating fully programmed control modules into the hardware to be controlled, thus creating a complete subsystem ready for direct assembly into a vehicle. A consequence of such vehicle subsystems is that a vendor may need to maintain or otherwise address potentially thousands of possible variants or calibrations of the subsystem due to the number of different configurations in which the subsystem may be used.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DESCRIPTION OF THE PREFERRED EMBODIMENT

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
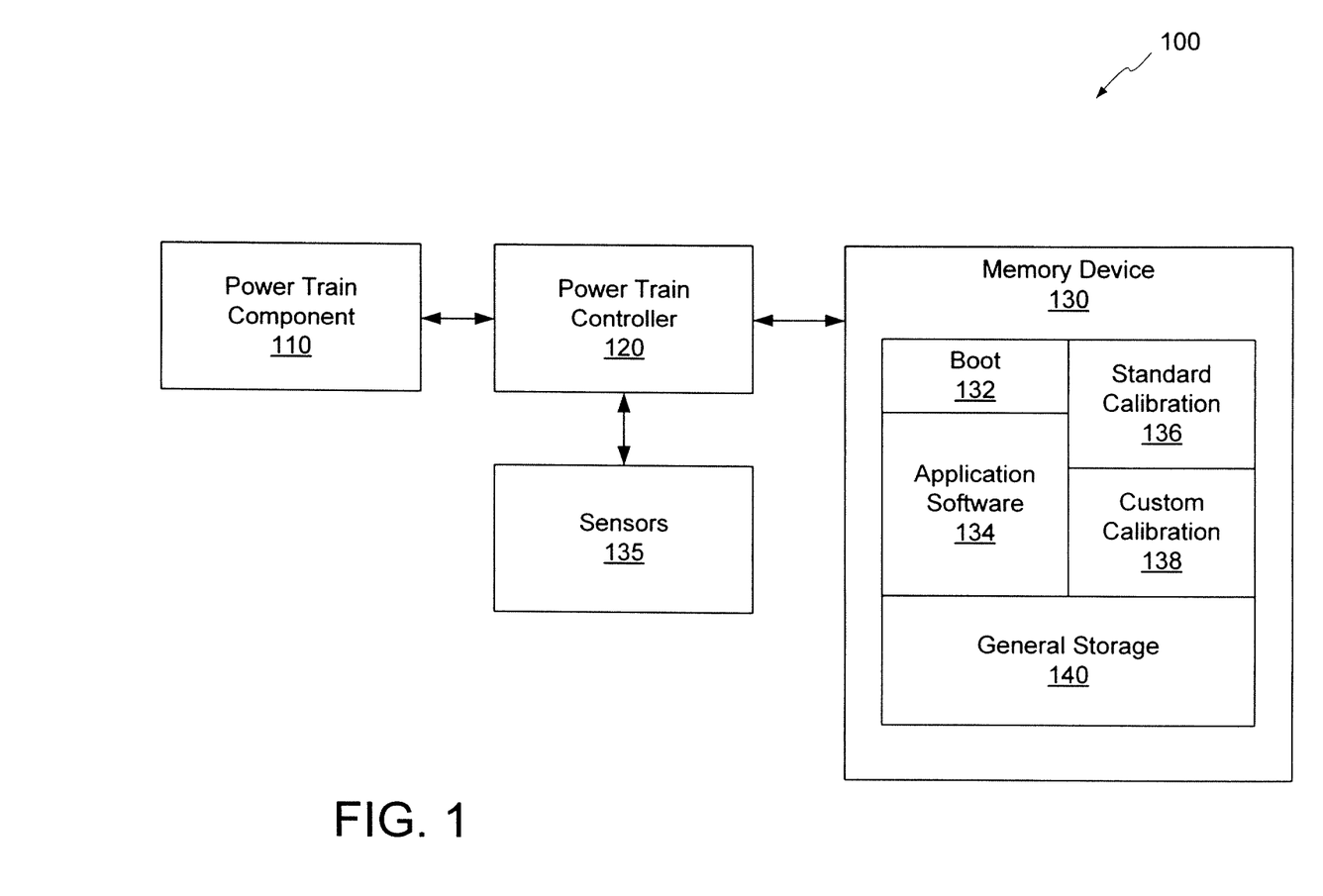
FIG. 1 shows an embodiment of power train subsystem having a power train controller and associated memory device.

Referring now to FIG. 1, a power train subsystem 100 is shown. The power train subsystem 100 may include a power train component 110, a power train controller 120 and associated memory device 130. The power train component 110 may include components of a motor vehicle used to generate power and/or transfer power to a drive assembly of the motorized vehicle. In particular, the power train component 110 may include an engine, transmission, transfer box, torque converter, and/or gear box.

The power train controller 110 may be coupled to the power train component 120 to control the power train component 120 via one or more control signals. The power train controller 110 may be further coupled to one or more sensors 135 in order to receive signals indicative of the operation of the power train component 120. Depending on the nature of the power train component 120, some or all of the sensors 135 may be integrated with the power train component 120 and/or some or all of the sensors 135 may be distributed throughout a vehicle in which the power train component 120 resides.

As shown in FIG. 1, the memory device 130 may be coupled to the power train controller 120. The memory device 120 may include boot code 132, application software 134, standard calibration parameters 136, and custom calibration parameters 138. The boot code 132 may include an operating system, drivers and other code which the power train controller 120 (e.g. ECU 240 or TCM 250) may execute in response to being powered up. The boot code 132 may provide an execution environment upon which the application software 134 may execute. The application software 134 may provide commands for controlling a class or range of power train components. For example, the application software 134 may provide commands for controlling one or more transmission models and/or one or more engine models. In response to executing the application software 134, the power train controller 120 may control the operation of the power train component based upon signals from sensors 135. In particular, the power train controller 120 in response to executing commands of the application software 134 may control the power train component 110 in accordance with standard calibration parameters 136 and custom calibration parameters 138.

In one embodiment, the power train controller 110 and the power train component 120 may be utilized in a wide variety of applications. The standard calibration parameters 136 provide various calibration data, constants, etc. which remain the same regardless of the application in which the power train controller 110 and power train component 120 are used. The custom calibration parameters 138 however provide various calibration data, constants, etc. which vary depending upon the application in which the power train controller 110 and power train component 120 are used. Accordingly, the memory device 130 may be programmed to include the boot code 132, application software 134 and standard calibration parameters 136 to obtain a partially programmed power train subsystem 100 that may be used in a wide variety of applications. Such a partially programmed power train subsystem 100 may be later programmed with custom calibration parameters 138 to obtain a fully programmed power train subsystem 100 once its determined to which application the power train subsystem 100 is destined.

In addition, the memory device 130 may also include general storage 140 for the application software 134. In one embodiment, the application software 134 may permit the storage and retrieval of customer modifiable constants (CMC) to and from the general storage 140. A technician, vehicle manufacturer, etc. may use the CMCs to trim the operation of a fully programmed engine subassembly 220 and/or a fully programmed transmission subassembly 230. The application software 134 may store diagnostic codes in response to a detected event. Similarly, the application software 134 may store freeze frame data comprising the capture of multiple operating parameters over a period of time in response to a detected event or in response to a request received from a technician. In one embodiment, the application software 134 may permit the capture and/or retrieval of data from various components connected to a vehicle network. The application software 134 may permit retrieval of such saved diagnostic codes, freeze frame data, and/or other component data in order to aid a technician in troubleshooting a malfunction or to aid technician in identifying operating characteristics indicative of a potential malfunction in the future.

The application software 134 may further permit the storage and retrieval of service manuals for one or more components of the vehicle, service records for one or more components of the vehicle, required service tools, wiring diagrams, and an as-built parts list for one or more components of the vehicle. The service manuals, service records, required service tools, wiring diagrams, and as-built part lists may aid a technician in determining which parts are in need of service and which parts have been serviced in the past. Moreover, such information may further aid the technician in identifying parts of the vehicle which have been replaced with parts not in conformance with parts of the vehicle as originally built.

Figure 2:
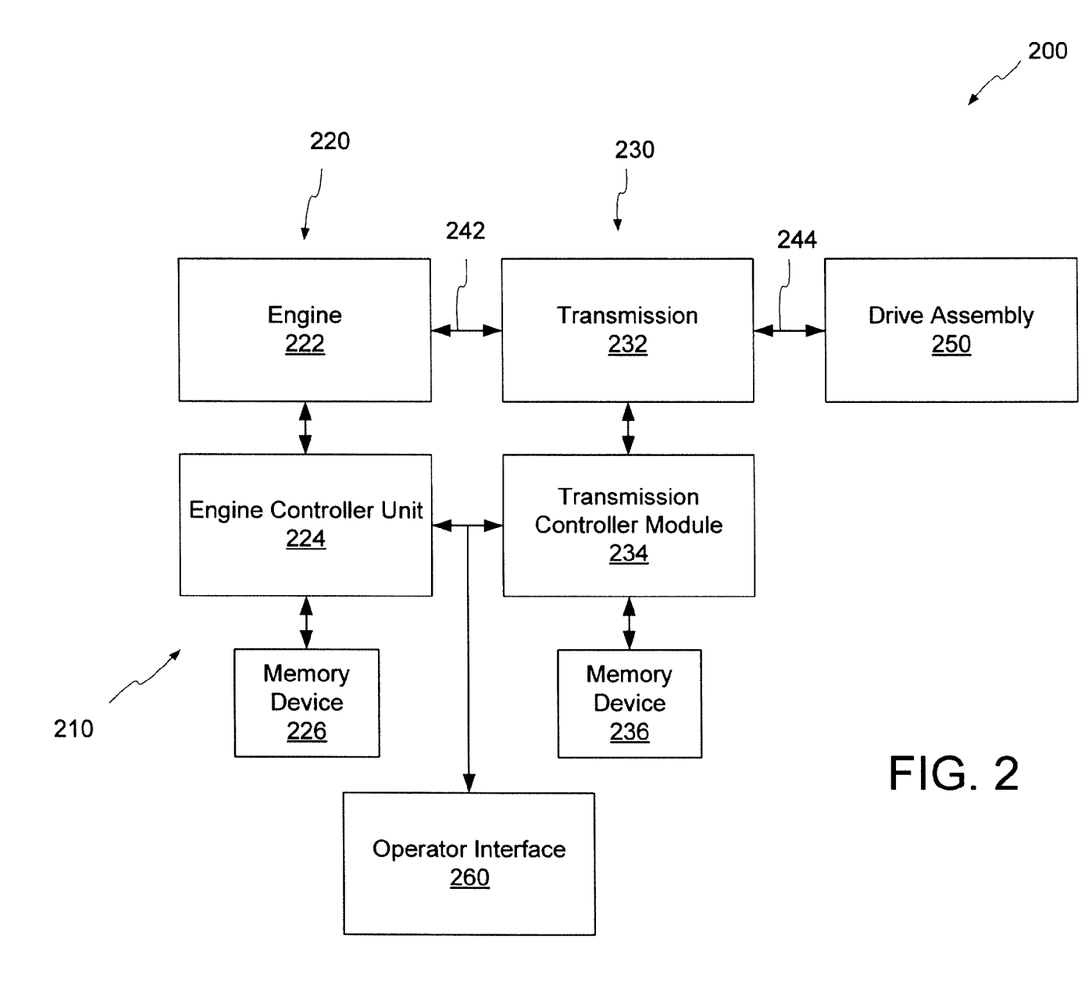
FIGS. 2-5 show embodiments of vehicles having one or more power train subsystems with associated memory device(s).

Referring now to FIG. 2, one embodiment of a motor vehicle 200 is shown that includes the power train subsystem 100 of FIG. 1. In particular, the motor vehicle 200 may include a power train 210, drive assembly 250, and operator interface 260. The power train 210 includes a first power train subsystem 220 and a second power train subsystem 230. The first power train subsystem 220 includes an engine 222, an engine control unit (ECU) 224, and memory device 226. The ECU 224 may be coupled to the engine 222 to control the engine 222. The ECU 224 may be further connected to various sensors 135 (FIG. 1) of the motor vehicle 200 that provide the ECU 224 with various operating conditions associated with operation of the engine 222.

The second power train subsystem 230 includes a transmission 232, transmission control module (TCM) 234 and memory device 236. The TCM 234 may be coupled to the transmission 232 to control the transmission 232. The TCM 234 may be further connected to various sensors 135 (FIG. 1) that provide the TCM 234 with various operating conditions associated with operation of the transmission 232.

The transmission 232 may provide a torque-speed conversion from the generally higher speed engine 222 to a slower but more forceful output such as the drive assembly 250. The drive assembly 250 may include drive wheels, caterpillar tracks, propels, etc. that impart the motor vehicle 200 with locomotion when driven by the engine 222 via the transmission 232. As shown, the engine 222 is coupled to an input shaft 242 of the transmission 232 to provide power to the transmission 232. An output shaft 244 of the transmission 232 is coupled to the drive assembly 250 to provide power to the drive assembly 250.

The ECU 224 and TCM 234 may be implemented using analog and/or digital circuit components. In one embodiment, the ECU 224 and the TCM 234 each include a processor such as a microcontroller or microprocessor. Furthermore, the ECU 224 and TCM 234 each have one or more associated memory devices 226, 236 that store instructions to be respectively executed by the ECU 224 and the TCM 234. The memory device 226, 236 may include programmable read only memory devices, flash memory device, random access memory devices, and/or other storage devices that store instructions to be executed and data to be processed by the ECU 224 and the TCM 234.

The motor vehicle 200 may further include operator controls 260. The operator controls 260 may include various levers, switches, pedals, buttons, wheels, dials, etc. which an operator of the motor vehicle 200 may actuate in order to control operation of the motor vehicle 200. The operator controls 260 may further include various output devices such as needles, digital outputs, displays, etc. that the operator may monitor in order to confirm operation of the motor vehicle 200.

The memory device 226 may be partially programmed to include boot code 132, application software 134, and standard calibration parameters 136 to configure the ECU 224 and engine 222 for a particular range of applications. Custom calibration parameters 138 may later be stored in the memory device 226 to obtain a fully programmed engine subsystem 220 which has been customized for a particular application.

For example, in one embodiment, the memory device 226 may be programmed with standard calibration parameters 136 that define a hardware characterization for the engine subsystem 220 (e.g. define a combustion model as a function of boost and fuel injected), that define a communication datalink infrastructure (e.g. protocols supported, message formats, etc.), and that define diagnostic and failure modes. The memory device 226 may also be programmed with standard calibration parameter 136 that define anti-abuse algorithms for the engine subsystem 220, that define fuel to air ratio algorithms, that define emissions control parameters, that define odometer parameters, and that define sensor and actuator parameters (e.g. calibration of oxygen sensor outputs to measurement values).

As for custom calibration parameters 138 for the engine subsystem 220, the memory device 226 may be programmed to include custom calibration parameters that define torque and horsepower ratings and that define communication datalink selections (e.g. protocols selected, devices from which to receive messages, etc.). The memory device 226 may further store custom calibration parameters that enable/disable general purpose input/output functions (e.g. the cruise control is ON and only active above the specified road speed). The memory device 226 may also store custom calibration parameters that define engine accessory features (e.g. engine brake, road speed governor, idle shutdown, PTO (power take-off) control, governor type, etc.).

Similarly, the memory device 236 may be partially programmed to include boot code 132, application software 134, and standard calibration parameters 136 to configure the TCM 234 and transmission 232 for a particular range of applications. Custom calibration parameters 138 may later be stored in the memory device 236 to obtain a fully programmed transmission subsystem 230 which has been customized for a particular application.

For example, in one embodiment, the memory device 236 may be programmed with standard calibration parameters 136 that define a hardware characterization of the transmission subsystem 230 (e.g. oil flow as a function of temperature), that define communication datalink infrastructure (protocols supported, message formats, etc.), and that define diagnostic and failure modes. The memory device 226 may also be programmed with standard calibration parameter 136 for the transmission subsystem 230 that define anti-abuse algorithms, that define base values of learning parameters (e.g. pressures and volumes), and that define general purpose input/output function design criteria. Standard calibration parameters 136 may also be stored on the memory device 226 that define for the transmission subsystem 230 shift times (e.g. how long to slip clutches) and that define for the transmission subsystem 230 sensor and actuator calibration (e.g. correlating a sensor output such as a voltage to a measured value such as temperature).

As for custom calibration parameters 138 for the transmission subsystem 230, the memory device 226 may be programmed to include custom calibration parameters that define shift schedules (e.g. engine speeds at which to upshift) and that define communication datalink selections (e.g. protocols selected, devices from which to receive messages, etc.). The memory device 226 may further store custom calibration parameters that define general purpose input/output function enables/disables (e.g. output shaft retarder is ON and only active above the specified road speed). The memory device 226 may also store custom calibration parameters 138 that enable/disable integrated vehicle functions (e.g. variable modulated main, cab warm-up mode, vehicle acceleration control, etc.).

Figure 3:
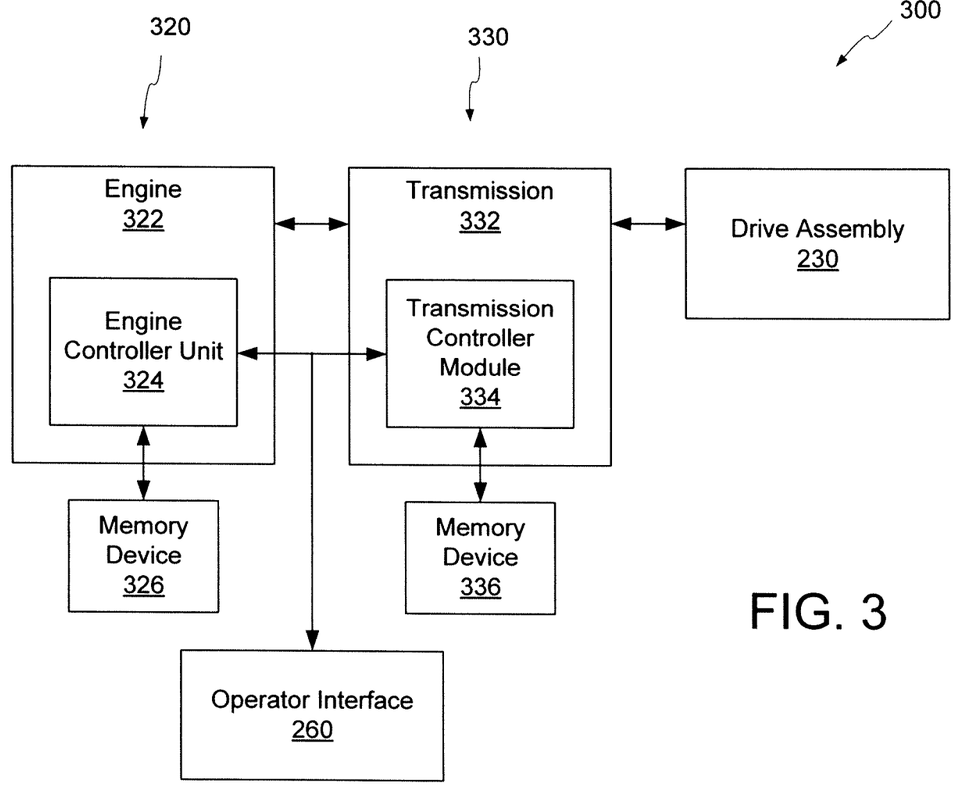

Referring now to FIG. 3, another embodiment of a vehicle 300 is shown. The vehicle 300 is similar to the vehicle 200 of FIG. 2. However, in the vehicle 300, the ECU 240 is internal to or otherwise integrated with the engine 310 instead of being external to the engine 210 as shown in the vehicle 200 FIG. 2. Similarly, in the vehicle 300, the TCM 250 is internal to or otherwise integrated with the transmission 320 instead of being external to the engine 210 as shown in the vehicle 200 of FIG. 2. While the ECU 240 and TCM 250 may be integrated into the respective power train components of the vehicle 300, the associated memory devices 245, 255 of vehicle 300 are still maintained external to the respective power train components to permit easy programming and/or replacement.

Figure 4:
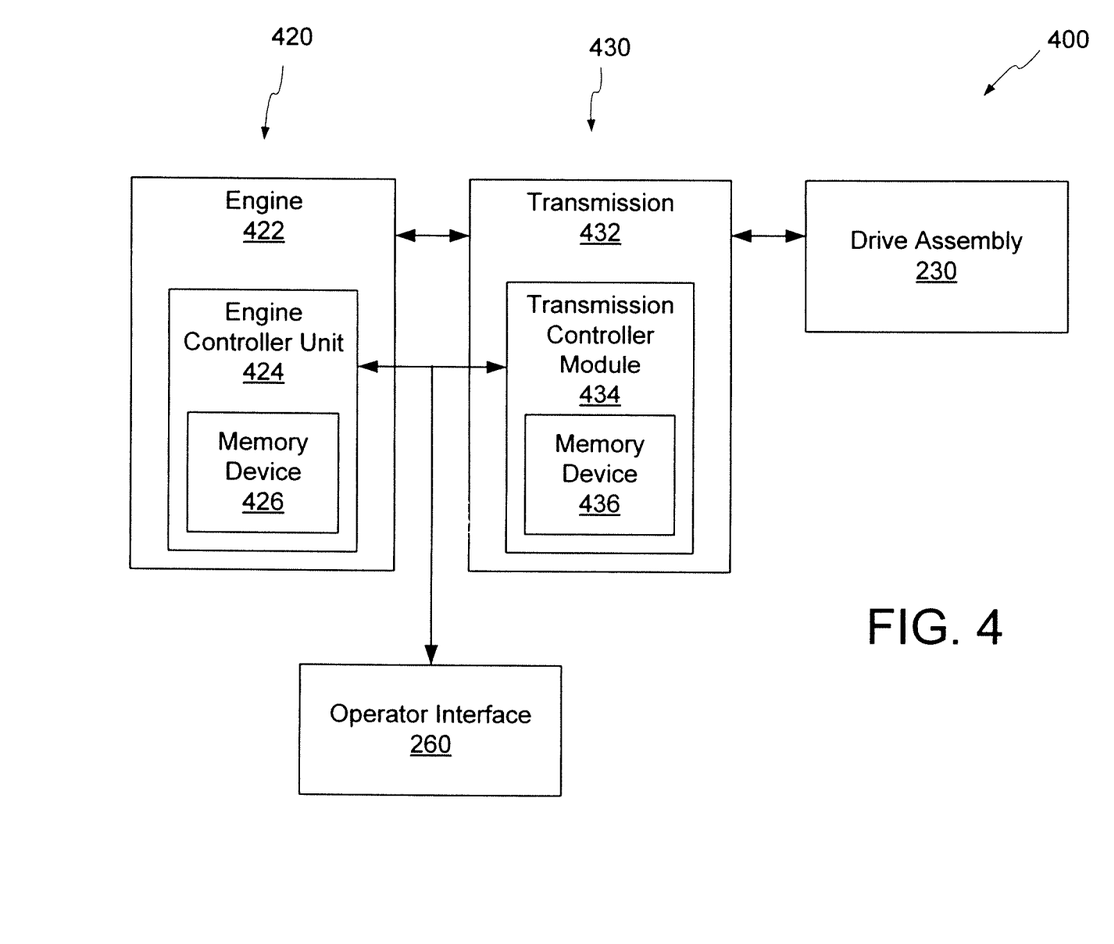

Referring now to FIG. 4, yet another embodiment of a vehicle 400 is shown. The vehicle 400 is similar to the vehicle 300 of FIG. 3. However, in the vehicle 400, the memory device 426 associated with the ECU 424 is affixed to or otherwise integrated with the ECU 424. Furthermore, the ECU 424 is internal to or otherwise integrated with the engine 422. Similarly, in the vehicle 400, the memory device 436 associated with the TCM 434 is affixed to or otherwise integrated with the TCM 434. The TCM 434 in turn is internal to or otherwise integrated with the transmission 432.

Figure 5:
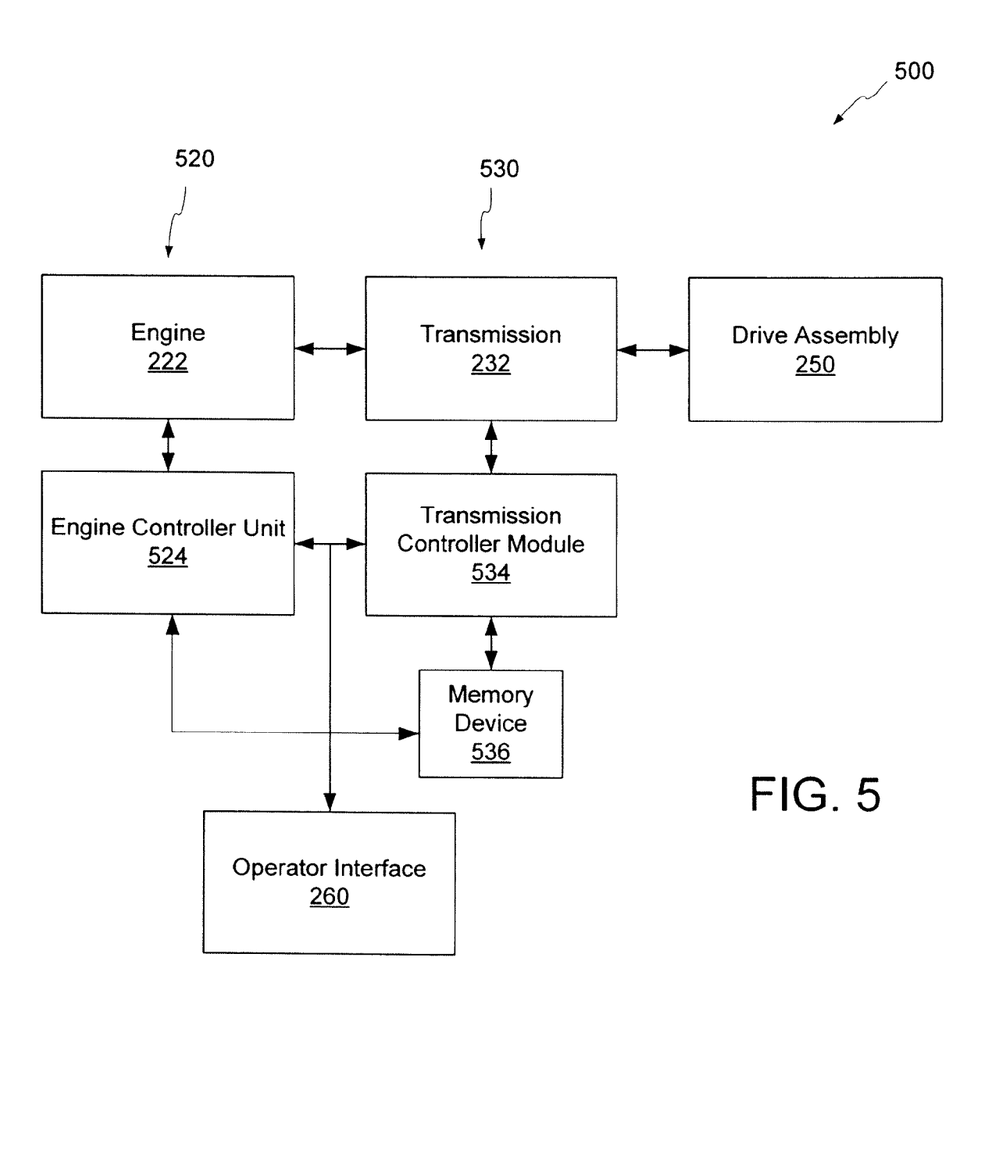

FIG. 5 depicts yet another embodiment of a vehicle 500. The vehicle 500 is similar to the vehicles 200, 300 and 400 of FIGS. 2-4. However, in the vehicle 500, the ECU 524 and TCM 534 share a memory device 536 instead of each having a separate memory device as shown in FIGS. 2-4. Moreover, the vehicle 500 shows the memory device 536 externally coupled to the ECU 524 and the TCM 534. However, in other embodiments, the memory device 536 may be affixed to or otherwise integrated with either the ECU 524 or the TCM 534 in a manner similar to the vehicle 400 of FIG. 4. Moreover, the ECU 524 and/or the TCM 534 may be internal to or otherwise integrated with their respective power train component 522, 532 in a manner similar to the vehicles 300, 400 of FIGS. 2 and 3.

Figure 6:
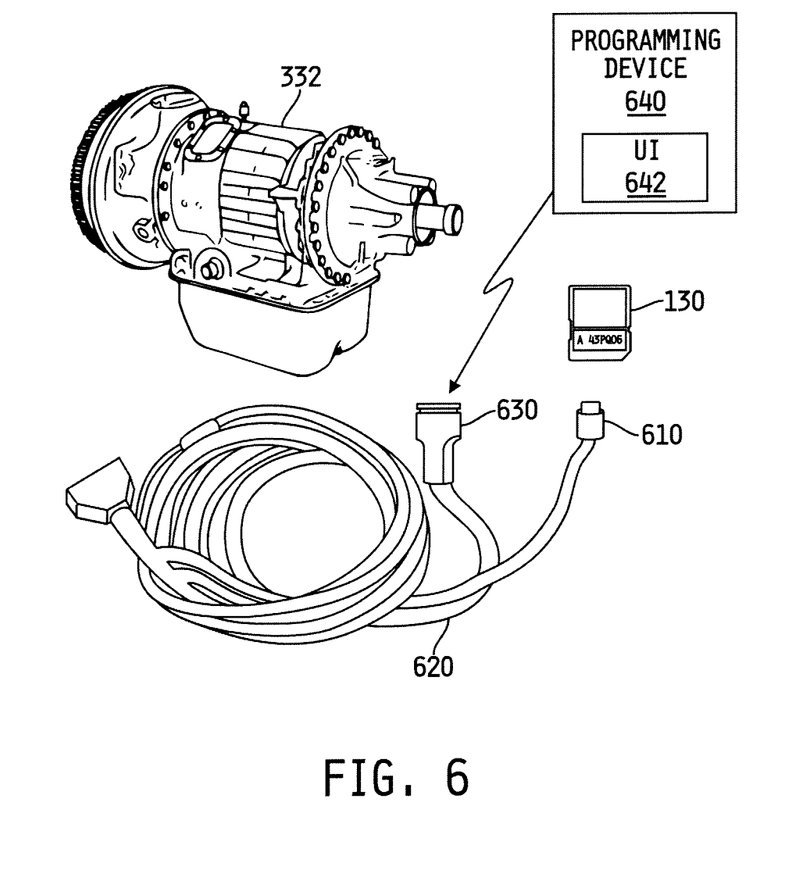
FIG. 6 shows a memory device coupled to a power train controller via a wiring harness.
Figure 7:
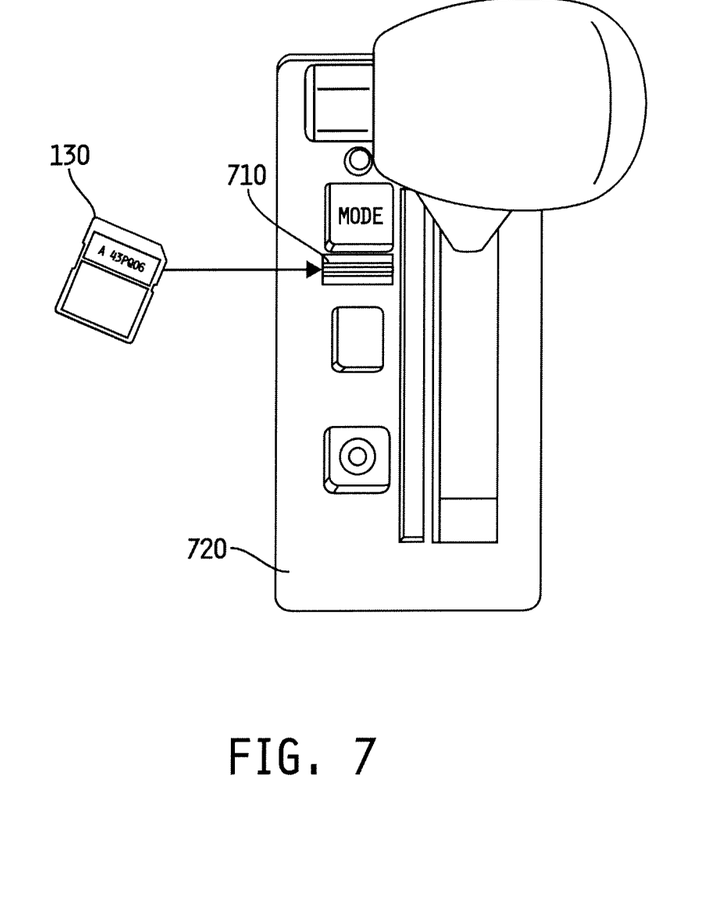
FIG. 7 shows a memory device coupled to a power train controller via a shift selector of the vehicle.
Figure 8:
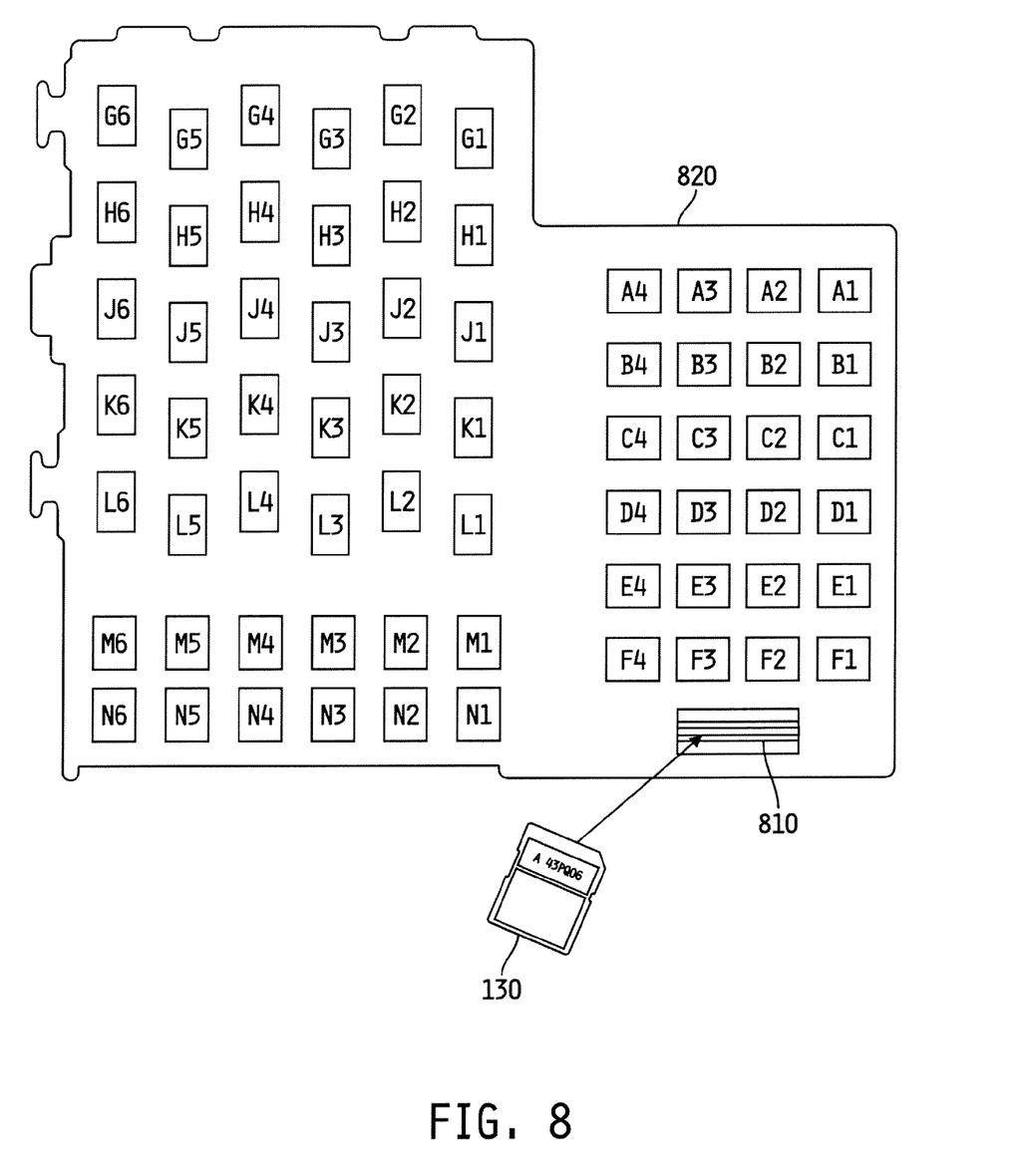
FIG. 8 shows a memory device coupled to a power train controller via a fuse block of the vehicle.

In the embodiments in which the memory device 130 is not affixed to or otherwise integrated with the power train controller 120 (e.g. vehicles 200, 300, and 500), the memory device 130 may be coupled to the power train controller 120 using a number of different techniques. For example, as shown in FIG. 6, the memory device 130 may be removably coupled a connector 610 of a wiring harness 620 which is used to operatively couple the TCM 334 of the transmission 332 to other components of the vehicle 300 such as the sensors 135 and operator interface 260. The memory device 130 may alternatively be removably coupled to a memory slot or connector 710 of a shift selector 720 of the operator interface 260 as shown in FIG. 7. FIG. 8 shows yet another location for the memory device 130. As shown, the memory device 130 may be removably coupled to connector 810 of a fuse block 820 of the vehicle.

Each of FIGS. 6-10 show the memory device 130 removably coupled to a connector thus permitting the removal of the memory device 130 for programming and/or replacement. However, in other embodiments, the memory device 130 may be affixed to the wiring harness 620, shift selector 720, fuse block 820, and/or other location of the vehicle. In such embodiments, the wiring harness 620, shift selector 720, fuse block 820, and/or other component of the vehicle may have a connector 630 for receiving a programming device 640 as shown in FIG. 6. The programming device 640 in one embodiment may program a partially programmed memory device 130 (e.g. memory device 130 having stored therein boot code 132, application software 134, and standard calibration parameters 136) with custom calibration parameters 138 for a particular vehicular application. To this end, the programming device 640 in one embodiment may comprise a self powered portable device which may be simply attached to connector 630.

The programming device 640 may include a user interface 642 such as a button or other user input device which may be actuated in order to initiate programming of the memory device 130. The programming device 640 in another embodiment may detect being coupled to the connector 630 and may automatically initiate programming of the memory device 130 upon detection. The user interface 642 of programming device 640 may also include an indicator (e.g. a lamp, LED, LCD, speaker) via which the programming device 640 may audibly and/or visually signal completion of the programming of the memory device 130. Besides a simple user interface of a button and an indicator, the programming device 640 may instead include a more sophisticated user interface 642 such a display, keypad, etc. via which the programming device 640 may display a progress indicator, via which a technician may select from among several custom calibration parameter sets for use in programming a power train subsystem or component thereof, and/or via which a technician may alter individual custom calibration parameters 138 of a memory device 130.

The above disclosure identified embodiments in which memory devices 130, 226, 326, 336, 426, 436, 536 were positioned at various location in the vehicle 100. It should be appreciated other embodiments may place a memory device 130 at positions in the vehicle 100 other than those positions identified above. In particular, in one embodiment, the memory device 130 may be positioned anywhere in and/or on the vehicle 100 that has access to a vehicular network (e.g. a CAN network) and the power train components coupled to the vehicular network. Similarly, the above embodiment of the programming device 640 indicates the programming device 640 is coupled to the memory device 130 via the connector 630 of the wiring harness 620. The programming device 640, however, in other embodiments may be coupled to the memory device 130 via other mechanisms. For example, in one embodiment, the programming device 640 may be directly connected to the memory device 130 via a connector of the memory device 130. In another embodiment, the programming device 640 may be coupled to a vehicular network of the vehicle 100 and may program the memory device 130 via the vehicular network.

Figure 9:
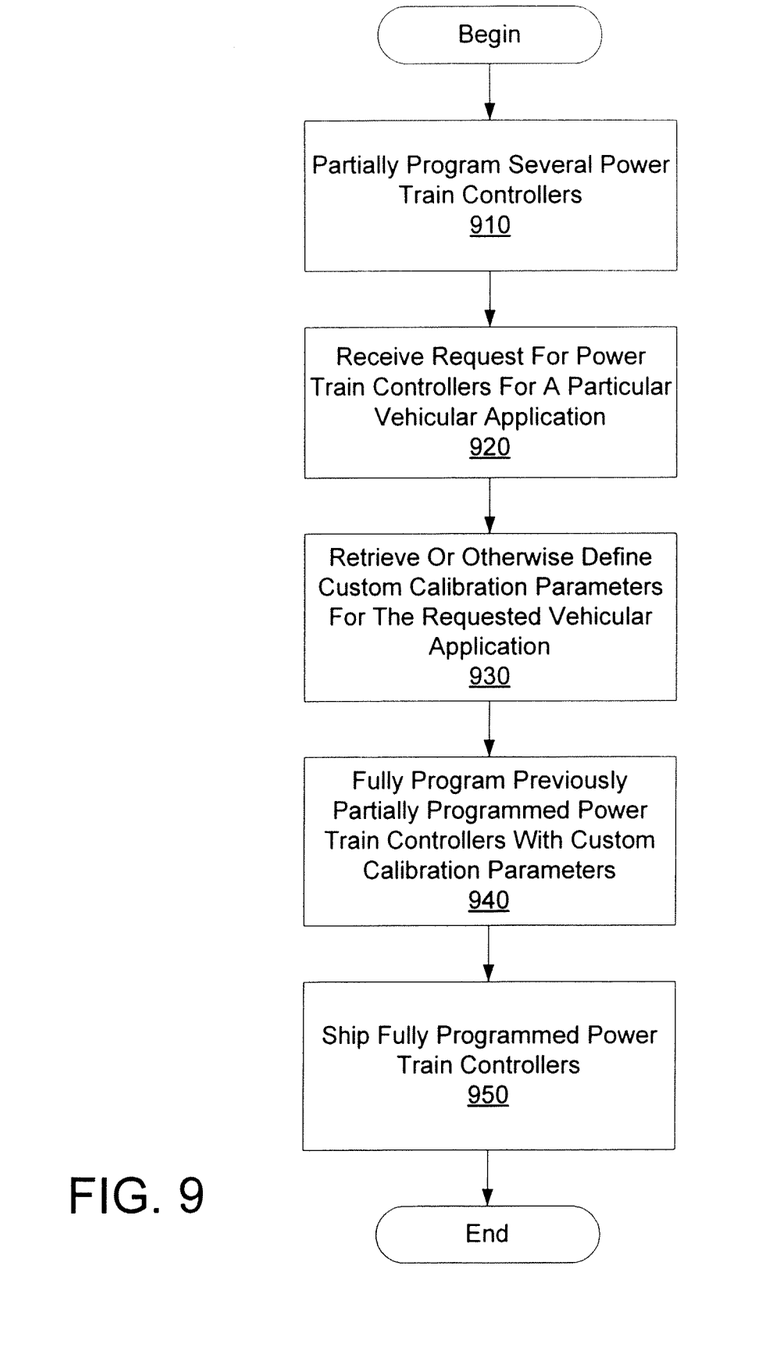
FIG. 9 shows one embodiment of a method of programming a power train controller for a particular vehicular application.

Referring now to FIG. 9, an embodiment of a method 900 for programming power train controllers 120 such as engine control units 224, 323, 424 and transmission control modules 234, 334, 434 is shown. As shown, a manufacturer at block 910 may partially program several power train controllers 120 for a class or range of power train components 110. For example, a transmission manufacturer may partially program the memory device 236 of several transmission control modules 234 with boot code 132, application software 134, and standard calibration parameters 136 thus configuring the transmission control modules 234 for use with a particular transmission 232 or class of transmissions 232 that may be used in a range of vehicular applications.

At block 920, the manufacturer may receive a request from a customer such as a parts distributor, vehicle manufacturer, etc. for a certain number of transmission subsystems fully programmed for a particular vehicular application. In response to such a request, the manufacturer at block 930 may retrieve or otherwise define custom calibration parameters 138 which configure the partially programmed transmission control modules 234 for the requested vehicular application. For example, the transmission manufacturer may maintain a database of predefined custom calibration parameters 138 for each supported vehicular application and therefore need only retrieve the appropriate custom calibration parameters 138 for the requested vehicular application. In another embodiment, the transmission manufacturer may manually define the custom calibration parameters 138 in order to satisfy a custom vehicular application specified by the customer.

The manufacturer at block 940 may fully program a number of power train controllers 120 which had been previously partially programmed to obtain the requested number of power train controller 120 which have been fully programmed for the requested vehicular application. In particular, the manufacturer may store the appropriate custom calibration parameters 138 for the requested vehicular application in the associated memory device 130 for each power train controller 120 being programmed for the customer. For example, the transmission manufacturer may store the retrieved or otherwise defined custom calibration parameters 138 in the associated memory device 236 for each transmission control module 234 in order to obtain the requested number of fully programmed transmission control modules 234 for the requested vehicular application.

At block 950, the manufacturer may ship the fully programmed power train controllers 120 to the customer. For example, the manufacturer may ship to the customer engine control units 224, 324, 424, 524 and/or transmission control modules 234, 334, 434, 534 which have been fully programmed for the vehicular application requested by the customer.

The partial programming of block 910 configures the power train controllers 120 for a range of applications. Thus, if the manufacturer partially programs a sufficient number of power train controllers 120 in step 910, the manufacturer may fulfill several customer requests (i.e. steps 920-950) without partially programming additional power train controllers 120 even though the requests may span several different vehicular applications since the power train controllers 120 are not customized for a particular vehicular application until fully programmed at block 940. Accordingly, the partially programmed power train controllers 120 may ultimate end up with different customers which requested power train controllers 120 for different vehicular applications.

Figure 10:
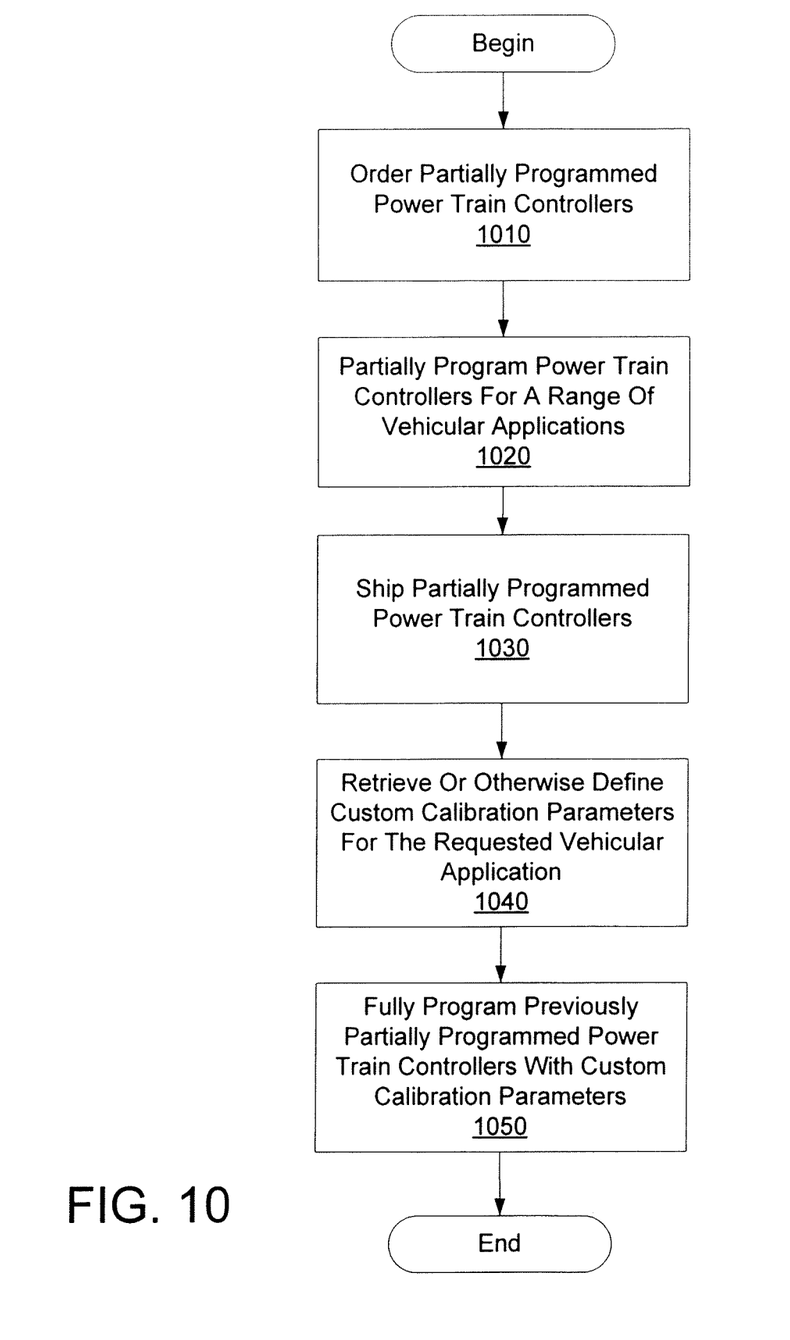
FIG. 10 shows another embodiment of a method of programming a power train controller for a particular vehicular application.

Referring now to FIG. 10, another embodiment of a method 1000 for programming power train controllers 120 such as engine control units 224, 323, 424 and transmission control modules 234, 334, 434 is shown. At block 1010, the manufacturer may receive a request from a customer such as a parts distributor, vehicle manufacturer, etc. for a certain number of power train subsystems which have been partially programmed for a particular vehicular application. Further, the manufacturer at block 1030 may ship the requested partially programmed power train subsystems to the customer.

A manufacturer at block 1020 may partially program power train controllers 120 and/or select from inventory previously programmed power train controllers 120 for requested range or class of vehicular application. For example, a transmission manufacturer may partially program the memory device 236 of several transmission control modules 234 with boot code 132, application software 134, and standard calibration parameters 136 thus configuring the transmission control modules 234 for use with a particular transmission 232 or class of transmissions 232 that may used in a range of vehicular applications.

At block 1030, the manufacturer may ship the partially programmed power train controllers 120 to the customer. For example, the manufacturer may ship to the customer engine control units 224, 324, 424, 524 and/or transmission control modules 234, 334, 434, 534 which have been partially programmed for the class or range of vehicular applications requested by the customer.

At block 1040, the customer may retrieve or otherwise define custom calibration parameters 138 which configure the partially programmed transmission control modules 234 for a particular vehicular application. For example, in one embodiment, the customer may maintain separate programming devices 645 for each vehicular application. In such a case, the customer may simply select an appropriate programming device 645 for the vehicular application. In another embodiment, the customer may have a programming device 645 suitable for fully programming power train subsystems for a range of vehicular applications. In such a case, the customer may select or otherwise define the appropriate custom calibration parameters 138 using an interface of the programming device 645.

At block 1050, the customer may program the power train subsystem (e.g. memory devices associated with ECU 224 or TCM 234) with the selected custom calibration parameters for the vehicular application. In one embodiment, the customer may fully program the power train subsystem prior to installing the power train subsystem in a corresponding vehicle 200, 300, 400, 500. In another embodiment, the customer may fully program the power train subsystem after the power train subsystem is installed in the corresponding vehicle 200, 300, 400, 500.

Similar to the method 900 of FIG. 9, the partial programming of block 1020 configures the power train controllers 120 for a range of applications. Thus, if the customer orders a sufficient number of partially programmed power train controllers 120 in step 1010, the customer may use the partially programmed power train controller 120 in several vehicular applications (i.e. steps 1040-1050) without ordering further partially programming power train controllers 120. The power train controllers 120 in one embodiment are not customized for a particular vehicular application until fully programmed at block 1050. Accordingly, the partially programmed power train controllers 120 ordered at block 1010 may ultimate end up in a variety of vehicular applications.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

What is claimed is:

1. A power train subsystem for a motorized vehicle, comprising:
    a power train component to drive a drive assembly,
    a controller coupled to the power train component to control operation of the power train component, and
    a memory device separate from the controller and comprising a boot code executed by the controller to define an operating environment, application software to provide the controller with commands to control the power train component, standard calibration parameters which configure the controller and power train component for a range of vehicular applications, and custom calibration parameters which configure the controller and power train component for a particular vehicular application of the range of vehicular applications, and
    a connector located on a fuse block of the motorized vehicle and communicatively coupled to the controller, the connector having a memory slot in which the memory device is received, wherein (i) the connector communicatively couples the memory device to the controller when the memory device is received in the memory slot and (ii) the memory device is removable from the memory slot.

2. The power train of claim 1, wherein
    the power train component comprises a transmission to transfer torque from an engine to the drive assembly, and
    the controller comprises a transmission control module externally coupled to the transmission to control operation of the transmission.

3. The power train of claim 1, wherein
    the power train component comprises a transmission to transfer torque from an engine to the drive assembly, and
    the controller comprises a transmission control module integrated into the transmission to control operation of the transmission.

4. The power train of claim 1, wherein,
    the power train component comprises an engine to deliver torque to the drive assembly transmission, and
    the controller comprises an engine control unit externally coupled to the engine to control operation of the engine.

5. The power train of claim 1, wherein,
    the power train component comprises an engine to deliver torque to the drive assembly transmission, and
    the controller comprises an engine control unit integrated into the engine to control operation of the engine.

6. The power train of claim 1, wherein the memory device further stores on-board diagnostic codes.

7. The power train of claim 1, wherein the memory device further stores freeze frame data regarding operational parameters of one or more components of the motorized vehicle.

8. The power train of claim 1, wherein the memory device further stores service manuals for one or more components of the motorized vehicle.

9. The power train of claim 1, wherein the memory device further stores service history for one or more components of the motorized vehicle.

10. The power train of claim 1, wherein the memory device further stores an as-built parts list for one or more components of the motorized vehicle.

\* \* \* \* \*